US007317471B2

(12) United States Patent
Fuse

(10) Patent No.: US 7,317,471 B2
(45) Date of Patent: Jan. 8, 2008

(54) IMAGE FORMING APPARATUS

(75) Inventor: Hiroyuki Fuse, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 350 days.

(21) Appl. No.: 11/092,402

(22) Filed: Mar. 29, 2005

(65) Prior Publication Data

US 2006/0227199 A1 Oct. 12, 2006

(51) Int. Cl.
*G03G 21/00* (2006.01)
*G02B 26/10* (2006.01)
*B41J 2/435* (2006.01)

(52) U.S. Cl. ........................................ 347/245; 399/99

(58) Field of Classification Search .................. 399/98, 399/99; 347/245

See application file for complete search history.

(56) References Cited

U.S. PATENT DOCUMENTS 6,308,024 B1 * 10/2001 Nakayama et al. ........... 399/98
7,173,646 B2 * 2/2007 Nakahata .................... 347/245

FOREIGN PATENT DOCUMENTS

JP H9-43940 8/1995
JP H11-167080 12/1997

OTHER PUBLICATIONS

Machine-generated translation of JP 09-043940.*

* cited by examiner

*Primary Examiner*—Huan Tran
(74) *Attorney, Agent, or Firm*—SoCal IP Law Group LLP; Steven C. Sereboff; John E. Gunther

(57) ABSTRACT

An image forming apparatus of the present invention installs electrodes in the neighborhood of a laser beam emitting window of a laser optical unit (hereinafter, abbreviated to LSU), applies a bias voltage to the electrodes, and forcibly adheres toner, developer, and dust floating in a machine body to the electrodes instead of the laser beam emitting window.

9 Claims, 4 Drawing Sheets

IMAGE FORMING APPARATUS

BACKGROUND OF THE INVENTION

1. Field of the Invention

The present invention relates to an image forming apparatus having a mechanism for preventing an optical system from adhesion of dust.

2. Description of the Related Art

There is an image forming apparatus available for exposing a laser beam onto the surface of a photoconductor from a laser beam source, forming an electrostatic latent image on the photoconductor, and forming an image on a sheet of paper by the electrophotographic method.

In such an image forming apparatus, when scanning the laser beam on the surface of the photoconductor, the optical system must be kept clean, though when in use, in the neighborhood of a laser beam emitting window of a laser optical unit (LSU), toner, developer, and dust which are floating in the machine body may be adhered.

If toner, developer, and dust which are floating in the machine body are adhered to the laser beam emitting window of the LSU during writing a latent image on the photoconductor using the laser optical unit, its areas on the photoconductor are not exposed to light, so that in the reproduced image, a line (generally a white line) is recorded perpendicularly to the scanning direction of the laser beam.

Conventionally, to prevent floating toner, developer, and dust from adhering to the laser beam emitting window, several arts are adopted.

For example, a fan is installed, and an air current is generated in the machine body, thus floating toner, developer, and dust are prevented from adhering to the laser beam outgoing window of the LSU.

Further, a transparent negative bias electrode is installed on the laser beam emitting window itself, and at the opposite position, a positive bias electrode having a formed opening in the optical path of the laser beam is installed, thus floating toner is prevented from adhering to the laser beam emitting window (for example, Japanese Patent Application 9-43940).

Further, in the laser beam emitting window of an optical housing for storing the optical system, the shutter which can open or close is installed, and when the printing operation is not in execution, the shutter is closed, thus toner, developer, and dust are prevented from adhering to the laser beam emitting window (for example, Japanese Patent Application 11-167080).

In the prior art 1, by the air current in the machine body which is generated by the fan, toner, developer, and dust floating in the machine body are prevented from approaching the laser beam emitting window, though it is difficult to generate an ideal air current in the machine body, and depending on the internal shape of the machine body, a place where the air current swirls is generated, and toner, developer, and dust floating in the machine body are inversely called, thus it is difficult to prevent them from adhering to the laser beam emitting window.

In the prior art 2, the electrode is installed on the laser beam emitting window itself, so that although it is transparent, due to the variation of the electrode thickness, the adhering condition and the transparency, the optical characteristics such as brightness and refractive index are changed, and the changes adversely affect the laser beam passing, and a problem arises that the effect appears in images.

Further, in the prior art 3, when the shutter is closed, toner, developer, and dust floating in the machine body can be prevented from adhering to the laser beam emitting window, though during the printing operation, the shutter must be opened, and particularly during continuous printing, the shutter is kept opened, and at this time, toner, developer, and dust floating in the machine body cannot be prevented from adhering to the laser beam emitting window.

DETAILED DESCRIPTION OF THE INVENTION

Throughout this description, the embodiments and examples shown should be considered as exemplar, rather than limitations on the apparatus and methods of the present invention.

Hereinafter, the embodiments of the present invention will be explained in detail with reference to the accompanying drawings.

Figure 1:
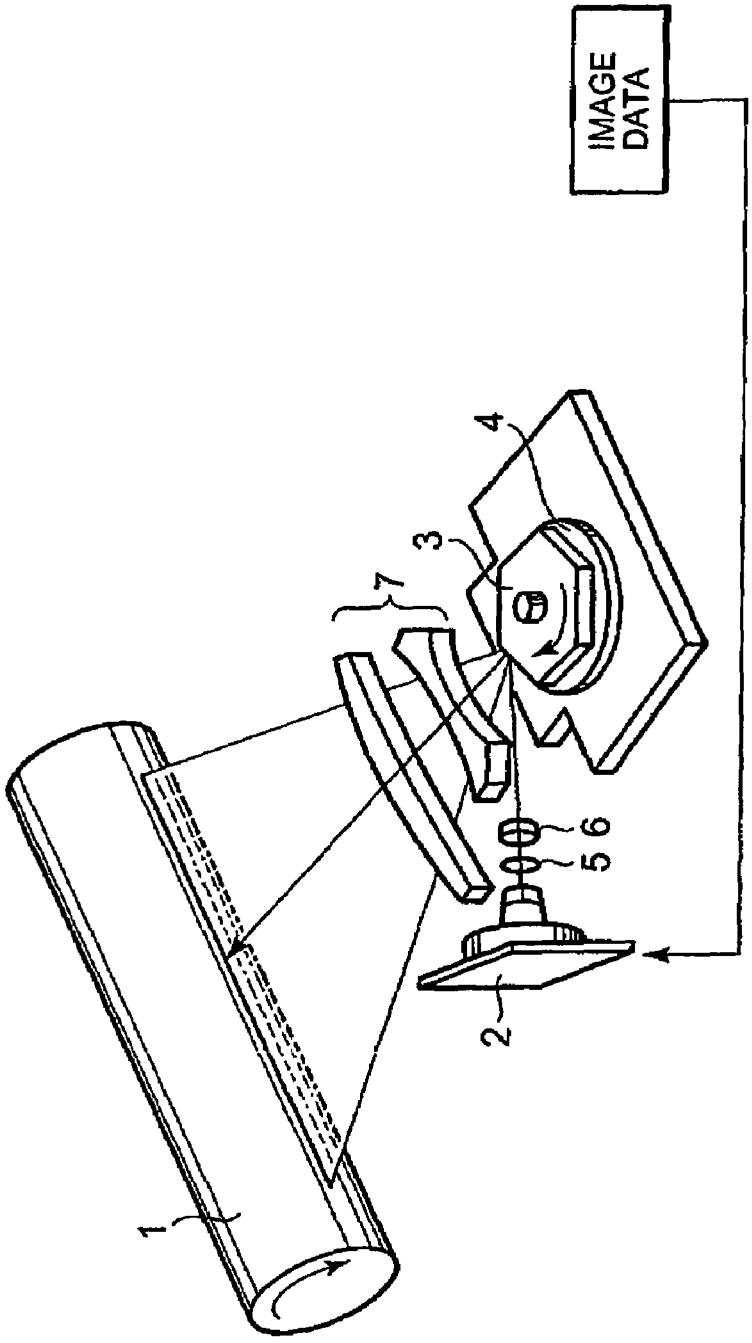
FIG. 1 is a schematic block diagram showing the optical system of the image forming apparatus.

FIG. 1 is a schematic block diagram showing the optical system of the image forming apparatus relating to the embodiments of the present invention.

In an image forming apparatus of the electrophotographic method for irradiating a laser beam onto the surface of a photoconductor from a laser beam source and forming an electrostatic latent image on the photoconductor, a photoconductor 1 of a double-layer structure having optical conductor layers installed on a conductive supporter is uniformly charged by plus corona discharge by a charging unit kept dark and then is exposed with a laser beam modulated by image data by a laser optical unit from a laser beam source 2. The resistance of the optical conductor of the exposed part is reduced, and the charge electrified flows to the ground, and on the surface of the photoconductor, a part where a charge remains and a part where no charge remains are produced. By irradiation of the laser beam, a potential difference is generated on the photoconductor 1 and the potential difference is formed on the photoconductor as an electrostatic latent image. Onto the photoconductor on which the electrostatic latent image is formed, toner is adhered and developed by a developing unit. The toner image formed on the photoconductor is transferred onto a recording paper conveyed between the photoconductor and a transfer unit by the transfer unit. The recording sheet with the toner image transferred is conveyed to a fixing unit and is heated and pressurized. The recording paper with the toner image fixed is ejected via a paper ejection mechanism. Toner remaining on the photosensitive drum after transfer is cleaned by a drum cleaner.

At the developing step, transfer step, and cleaning step mentioned above, floating toner, a residue of the developer, dusts are caused.

A laser optical unit 100 is a part for scanning the photoconductor 1 on the basis of the image data and in the optical housing, the parts such as a light source unit 2, various lenses, a polygonal mirror 3, and a polygonal mirror motor 4 are stored.

The light source unit 2, for example, uses a semiconductor laser and emit a laser beam modulated by the image data. A dispersion beam emitted from the laser beam source passes through a collimator lens 5 and a cylindrical lens 6, thereby is converted to a linear parallel beam, and enters the polygonal mirror 3.

The polygonal mirror 3 is a many-sided mirror making 20000 to 30000 revolutions per minute at a fixed speed, repeatedly deflects the incident laser beam at a uniform angular velocity in the main scanning direction, and reflects it toward an fθ lens 7.

The fθ lens 7 which is an image forming lens focuses the laser beam entering from the polygonal mirror 3 and forms an image in one plane on the surface of the photoconductor, gives optical distortion to the incident light at the uniform angular velocity, and converts (fθ characteristics) it so as to scan on the surface of the photoconductor at the uniform velocity. The fθ lens 7 is composed of, for example, a spherical lens and a topic lens or an aspherical lens system and corrects the inclination of light in micrometer.

Figure 2:
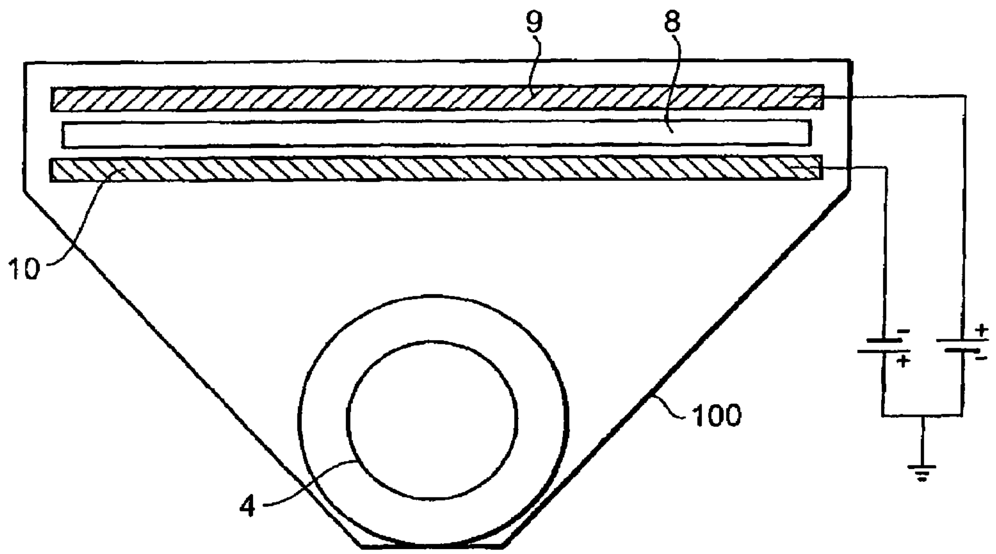
FIG. 2 is a drawing, viewed from above, of the essential section of the laser optical unit relating to the present invention.
Figure 3:
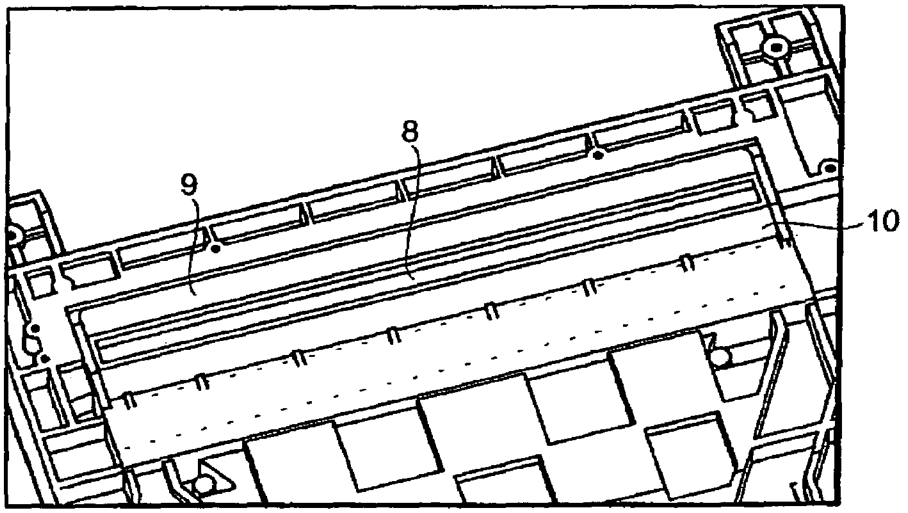
FIG. 3 is a drawing, viewed from back, of the essential section of the laser optical unit relating to the present invention.

FIG. 2 shows the essential section of the laser optical unit 100 viewed from above. Further, FIG. 3 shows the essential section of the laser optical unit 100 viewed from back. In FIGS. 2 and 3, in the laser optical unit 100, the polygonal mirror motor 4 for driving the polygonal mirror 3 is arranged and above the polygonal mirror motor 4 (in the drawing), a laser beam emitting window 8 is formed. The laser beam emitting window 8 is composed of a transparent glass plate.

In the neighborhood of the laser beam emitting window 8, two electrodes 9 and 10 are arranged almost in parallel with each other across the laser beam emitting window 8. The electrodes can be formed, for example, by attaching a metal plate. Further, the electrodes may be formed by coating conductive paint.

The electrodes 9 and 10 are composed of the electrode 9 with a positive bias voltage applied and the electrode 10 with a negative bias voltage applied. In this embodiment, on the side of the polygonal mirror 4, the negative bias electrode 10 is positioned. The interval between the two electrodes 9 and 10 is larger than the diameter of the laser beam.

Figure 4:
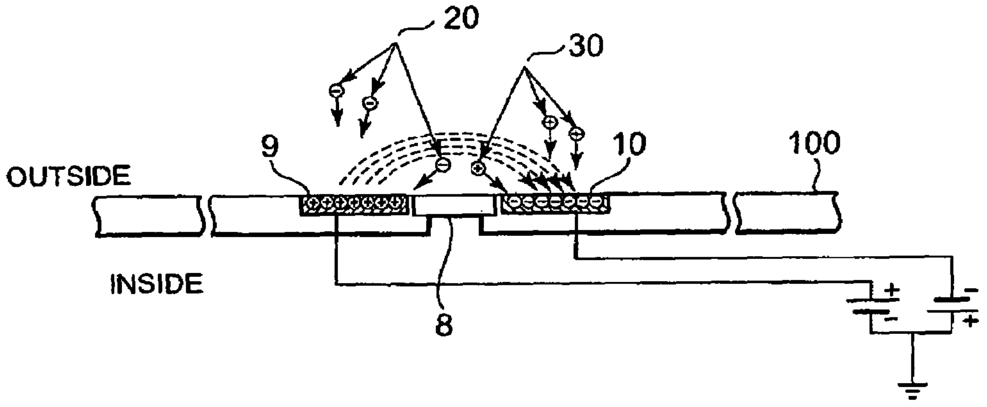
FIG. 4 is a cross sectional view in the neighborhood of the laser beam emitting window relating to the present invention.

FIG. 4 shows the cross section in the neighborhood of the laser beam emitting window 8.

The positive and negative bias electrodes 9 and 10 are installed across the laser beam emitting window 8, so that as shown in FIG. 4, when a predetermined voltage is applied to the positive and negative bias electrodes 9 and 10, an electric field is generated between the electrodes and toner, developer, and dust drifting about in the neighborhood of the laser beam emitting window 8 are pulled near the electrodes along the electric field by the coulomb force.

Generally, toner, developer, and dust floating in the machine body are charged more or less positive or negative. Floating toner and a developer 20 are often charged negative, while dust 30 such as paper dust is indefinite in positive or negative.

The coulomb force pulls toner, developer, and dust floating in the machine body near the electrodes, so that the frequency of adhering toner, developer, and dust to the laser beam emitting window 8 can be reduced greatly, thus an occurrence of a defective image can be suppressed.

According to the dust amount of floating toner, developer, and dust, the voltage to be applied to the positive bias electrode and the voltage to be applied to the negative bias electrode can be made different from each other. Namely, as a dust amount in the machine body, for example, when there is much floating toner, the voltage to be applied to the positive bias electrode 9 is increased and the voltage to be applied to the negative bias electrode 10 is decreased.

Figure 5A:
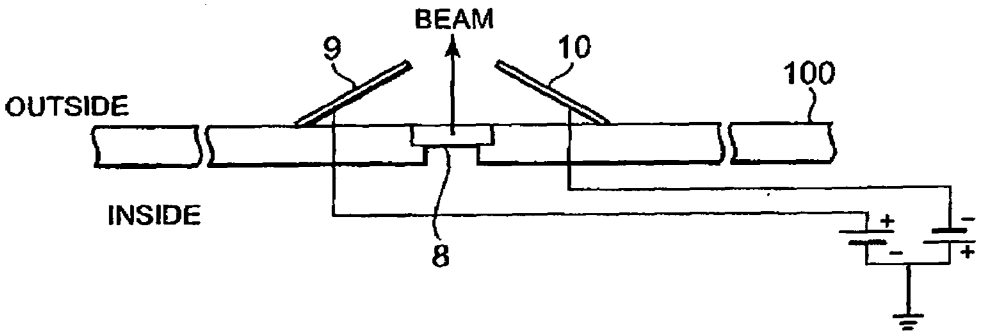
FIG. 5A is an illustration showing the position of the electrode relating to the present invention.
Figure 5B:
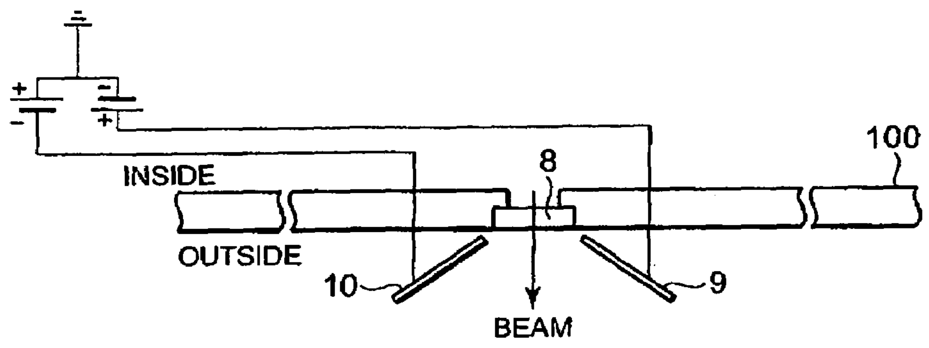
FIG. 5B is an illustration showing the position of the electrode relating to the present invention.

The electrodes 9 and 10 do not need to be installed flatly in the neighborhood of the laser beam emitting window 8. As shown in FIGS. 5A and 5B, the electrodes can be arranged opposite to each other across the laser beam emitting window 8 of the laser optical unit 100. When the use of the image forming apparatus is finished, the main power source of the apparatus is turned off. In this case, to the electrodes 9 and 10, both positive and negative bias voltages are not applied. The reason is that floating toner, developer, and dust which are adhered to the electrodes 9 and 10 are allowed to slide down from the electrode surfaces by their own weights so as to separate from the laser beam emitting window 8. When the laser optical unit body is installed so as to emit the laser beam upward from the laser beam emitting window 8, as shown in FIG. 5A, the electrodes 9 and 10 are arranged so that the rears thereof are opposite to each other. Further, when the laser optical unit body is installed so as to emit the laser beam downward from the laser beam emitting window 8, as shown in FIG. 5B, the electrodes 9 and 10 are arranged so that the surfaces thereof are opposite to each other.

Next, another embodiment of the present invention will be explained below.

Figure 6:
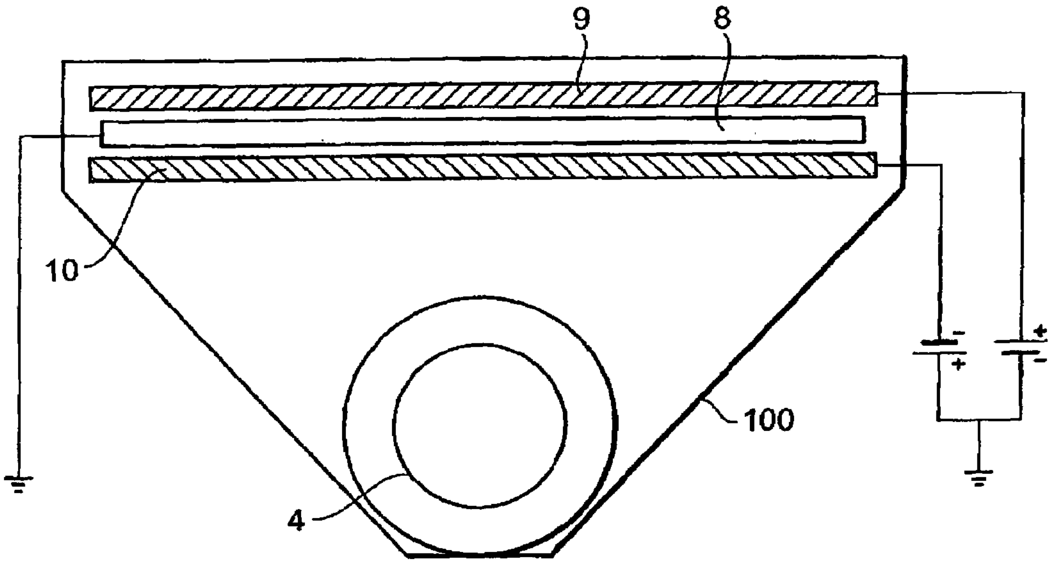
FIG. 6 is a drawing, viewed from above, of the essential section of the laser optical unit relating to another embodiment.

As shown in FIG. 6, to prevent the laser beam emitting window 8 itself from being charged, the laser beam emitting window 8 is composed of a conductive material and is grounded, thus the effect can be heightened more. For example, a thin film of NESA glass using tin oxide or of indium oxide is formed for a transparent electrode and conductive glass given conductivity is preferable.

Further, the bias voltage mentioned above may use an exclusive power source, though to suppress an increase in cost, the development and transfer bias power source may be shared.

As mentioned above in detail, according to the embodiments of the present invention, toner, developer, and dust floating in the machine body are generally charged more or less positive or negative. Therefore, both a positive bias electrode and a negative bias electrode are installed in the neighborhood of the laser beam emitting window of the laser optical unit, and a bias voltage is applied to the electrodes, thus toner, developer, and dust floating in the machine body are pulled near the electrodes by the coulomb force, so that toner, developer, and dust floating in the machine body can be prevented from adhering to the laser beam emitting window.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. An image forming apparatus having a laser optical unit for forming a latent image on a photoconductor via an optical system for scanning light emitted from a laser beam source according to input information, comprising:

a toner image forming unit for forming a toner image on said photoconductor, a transfer unit for transferring said toner image on said photoconductor onto a sheet of paper, a fixing unit for heating and fixing said toner image on said sheet of paper, and a conveying unit for ejecting said sheet of paper on which said toner image is fixed, a scanning light emitting window installed on said laser optical unit, two electrodes arranged along both sides in a longitudinal direction of said scanning light emitting window, one of said electrodes being applied with a positive bias voltage and the other one of said electrodes being applied with a negative bias voltage, and a power source for applying a voltage between said electrodes.

2. An image forming apparatus according to claim 1, wherein:

said electrodes are composed of a metallic plate.

3. An image forming apparatus according to claim 1, wherein:

said electrodes are formed by coating conductive paint.

4. An image forming apparatus according to claim 1, wherein:

on a polygonal mirror motor side installed in said laser optical unit, said negative bias electrode is positioned.

5. An image forming apparatus according to claim 1, wherein:

an interval between said two electrodes is larger than a laser beam diameter.

6. An image forming apparatus according to claim 1, wherein:

according to a dust amount of floating toner, developer, and dust, said voltage to be applied to said positive bias electrode and said voltage to be applied to said negative bias electrode are different from each other.

7. An image forming apparatus according to claim 1, wherein:

said positive bias electrode and said negative bias electrode are arranged with a gradient and opposite to each other across said scanning light emitting window.

8. A dust processing method of an image forming apparatus having a laser optical unit for forming a latent image on a photoconductor via an optical system for scanning light emitted from a laser beam source according to input information, wherein:

in the neighborhood of a front of said scanning light emitting window installed in said laser optical unit, an electrode applied with a positive bias voltage and an electrode applied with a negative bias voltage arranged across said emitting window are installed and according to a dust amount of floating toner, developer, and dust, said voltage to be applied to said positive bias electrode and said voltage to be applied to said negative bias electrode are made different from each other.

9. A method of dust handling according to claim 8, wherein:

when a main power source of said image forming apparatus is turned off, said dust adhered to said electrodes is allowed to fall by its own weight in a place remote from said emitting window.

* * * * *

UNITED STATES PATENT AND TRADEMARK OFFICE

CERTIFICATE OF CORRECTION

PATENT NO. : 7,317,471 B2 Page 1 of 1
APPLICATION NO. : 11/092402
DATED : January 8, 2008
INVENTOR(S) : Fuse It is certified that error appears in the above-identified patent and that said Letters Patent is hereby corrected as shown below:

Column 3, line 30, replace "topic" with --toric--.

Signed and Sealed this

Sixth Day of May, 2008

JON W. DUDAS
*Director of the United States Patent and Trademark Office*